(12) United States Patent
Masumoto (10) Patent No.: US 10,252,606 B2
(45) Date of Patent: Apr. 9, 2019

(54) BUFFER

(71) Applicant: NISHIKAWA RUBBER CO., LTD., Hiroshima (JP)

(72) Inventor: Atsuo Masumoto, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 15/836,181

(22) Filed: Dec. 8, 2017

(65) Prior Publication Data

US 2018/0170163 A1    Jun. 21, 2018

(30) Foreign Application Priority Data

Dec. 16, 2016   (JP) ................. 2016-244863

(51) Int. Cl.
| | |
|---|---|
| *B60J 10/86* | (2016.01) |
| *E05F 5/06* | (2006.01) |
| *B62D 33/03* | (2006.01) |
| *B60J 5/10* | (2006.01) |

(52) U.S. Cl.
CPC ............... *B60J 10/86* (2016.02); *B60J 5/108* (2013.01); *B62D 33/03* (2013.01); *E05F 5/06* (2013.01); *E05Y 2201/212* (2013.01); *E05Y 2900/546* (2013.01)

(58) Field of Classification Search
CPC ............ B60J 10/86; B60J 5/108; B62D 33/03
USPC ........................................ 296/57.1
See application file for complete search history.

(56) References Cited

U.S. PATENT DOCUMENTS

| 4,277,099 A * | 7/1981 | Klein ................. B60J 10/86 |
| | | 296/146.9 |
| 6,749,245 B1 * | 6/2004 | Walker .............. B62D 33/0273 |
| | | 296/57.1 |

FOREIGN PATENT DOCUMENTS

| JP | 2-99046 | 8/1990 |
| JP | 2016-078752 | 5/2016 |

* cited by examiner

*Primary Examiner* — Joseph D. Pape
(74) *Attorney, Agent, or Firm* — Casimir Jones, SC; Robert A. Goetz (57) ABSTRACT

Provided is a buffer which prevents damage to a lower edge of a baggage gateway of a baggage-containing section and which is not easily worn down or damaged when rubbed by baggage. The buffer includes a fixing section, a contact section, and a connecting section. At a vehicle-interior-side end of the connecting section, a lower surface of the connecting section is provided at a height obtained by subtracting (a) a thickness, in a vertical direction, of the vehicle-interior-side end of the connecting section from (b) a height, in the vertical direction, measured from the surface of the lower edge to a first top portion. At a vehicle-exterior side end of the connecting section, the lower surface of the connecting section is provided at a height obtained by subtracting (a) a thickness, in the vertical direction, of the vehicle-exterior-side end of the connecting section from (b) a height, in the vertical direction, measured from the surface of the lower edge to a second top portion.

4 Claims, 5 Drawing Sheets

BUFFER

This Nonprovisional application claims priority under 35 U.S.C. § 119 on Patent Application No. 2016-244863 filed in Japan on Dec. 16, 2016, the entire contents of which are hereby incorporated by reference.

TECHNICAL FIELD

The present invention relates to a buffer.

BACKGROUND ART

Cargo beds of automotive vehicles such as trucks and vans have, at a rear end thereof, a tailgate which is mounted in a manner so as to be openable and closable. Due to the structure of tailgates and cargo beds, a gap is formed between a lower edge of a tailgate and a rear end of a cargo bed deck. Water, dust, and the like get into this gap. Furthermore, when the tailgate is open (that is, in a state where the tailgate lies horizontally), loading and unloading of baggage can be difficult due to the baggage getting caught in a groove formed between the lower edge of the tailgate and the rear end of the cargo bed deck. There have been advancements in research and development of various techniques for solving these problems.

For example, Patent Literature 1 discloses a device for preventing water infiltration through a cargo bed gate. In this device, a gate (equivalent to a tailgate), which is rotatably provided at an edge of a cargo bed, includes a recessed section at a lower end thereof, and a sealing member is engaged with the recessed section. In another example, Patent Literature 2 discloses a structure of a tailgate cover for a vehicle. This structure includes a cover member having (i) a fixing member fixed on a deck endplate side between a tailgate and a deck endplate and (ii) a cover body which is plate-like and connected to the fixing section via a hinge section.

CITATION LIST

Patent Literature

[Patent Literature 1]
Japanese Unexamined Utility Model Application Publication Jitsukaihei No. 2-99046 (Publication Date: Aug. 7, 1990)
[Patent Literature 2]
Japanese Unexamined Utility Model Application Publication Jitsukaisho No. 63-119413 (Publication date: Aug. 2, 1988)

SUMMARY OF INVENTION

Technical Problem

Unfortunately, the device of Patent Literature 1 has the following problem. Because the gate and the sealing member rotate together, when baggage is loaded or unloaded while the gate is open, the sealing section does not sustain damage, but the baggage impacts and damages a portion where there is a level difference, which portion is formed by a mounting member and an upper part of a side rail. The structure of Patent Literature 2 as well has the following problem. When the tailgate is open and baggage is loaded or unloaded, the baggage rubs against the cover member. Because the cover member is plate-like, it does not bend sufficiently when the baggage is placed thereon. There is therefore the risk that the surface of the cover member will be worn down and that, depending on the weight of the baggage, the cover member will be damaged.

The present invention was made in view of the above problems. An object of the present invention is to provide a buffer which, when baggage is loaded and unloaded while a tailgate is open, prevents damage to a lower end of an edge of a cargo bed and which is not easily worn down or damaged even when rubbed by the baggage.

Solution to Problem

In order to solve the above problems, a buffer in accordance with an aspect of the present invention is a buffer which mounts to a lower edge of a baggage gateway through which baggage is loaded onto and unloaded from a baggage-containing section for containing the baggage, the buffer including: a fixing section which is configured to be fixed along the lower edge; a contact section having a tip which tip comes into contact with the lower edge; and a connecting section which connects (i) a first top portion, which is a top portion of a vehicle-exterior-side face of the fixing section, to (ii) a second top portion, which is a top portion of a vehicle-interior-side face of the contact section, the contact section and the connecting section each being made of an elastic material, the connecting section being provided such that, in a state where the buffer has been mounted to the lower edge: at a vehicle-interior-side end of the connecting section, a lower surface of the connecting section is vertically upward of a surface of the lower edge at a height obtained by subtracting (a) a thickness, in a vertical direction, of the vehicle-interior-side end of the connecting section from (b) a height, in the vertical direction, measured from the surface of the lower edge to the first top portion; and at a vehicle-exterior side end of the connecting section, the lower surface of the connecting section is vertically upward of the surface of the lower edge at a height obtained by subtracting (a) a thickness, in the vertical direction, of the vehicle-exterior-side end of the connecting section from (b) a height, in the vertical direction, measured from the surface of the lower edge to the second top portion.

Advantageous Effects of Invention

An aspect of the present invention makes it possible to provide a buffer which, when baggage is loaded onto and unloaded from a baggage-containing section through a baggage gateway, prevents damage to a lower edge of the baggage gateway and which is not easily worn down or damaged when rubbed by the baggage.

DESCRIPTION OF EMBODIMENTS

<Example of Mounting of Buffer>

Figure 1:
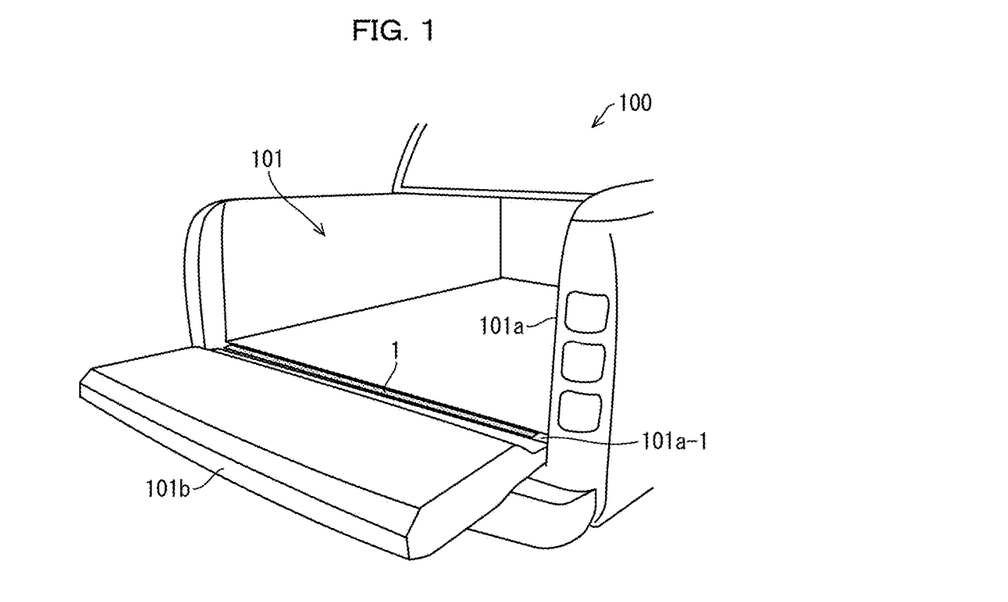
FIG. 1 is an external view of a cargo bed of a pickup truck, to which cargo bed a buffer 1 in accordance with an embodiment of the present invention is mounted.

Discussed first, with reference to FIG. 1, is an example of how a buffer 1, in accordance with an embodiment of the present invention, is mounted. FIG. 1 is an external view of a cargo bed 101 of a pickup truck 100 to which cargo bed 101 the buffer 1 is mounted.

Figure 2:
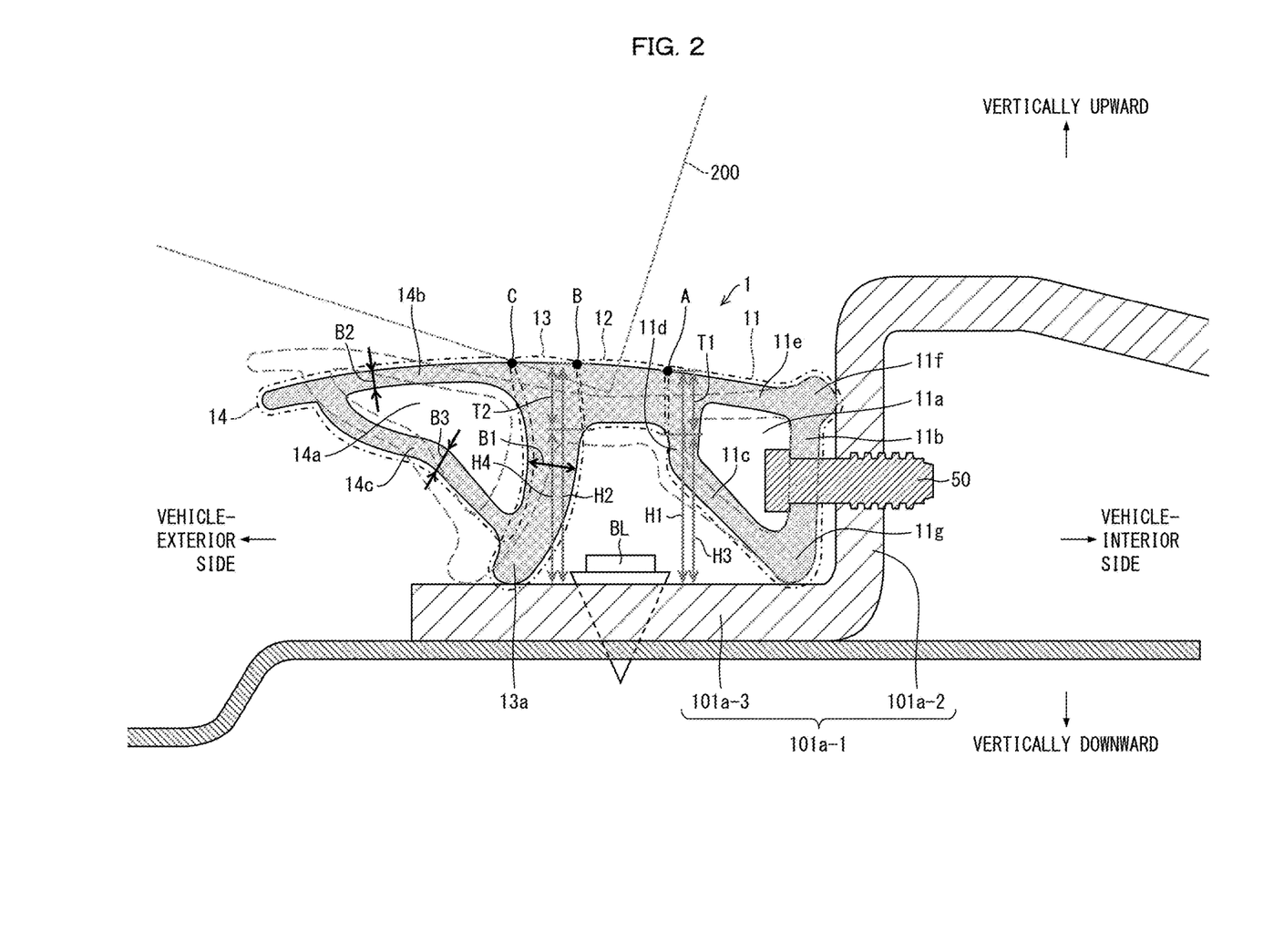
FIG. 2 is a cross-sectional view schematically illustrating the buffer.
Figure 3:
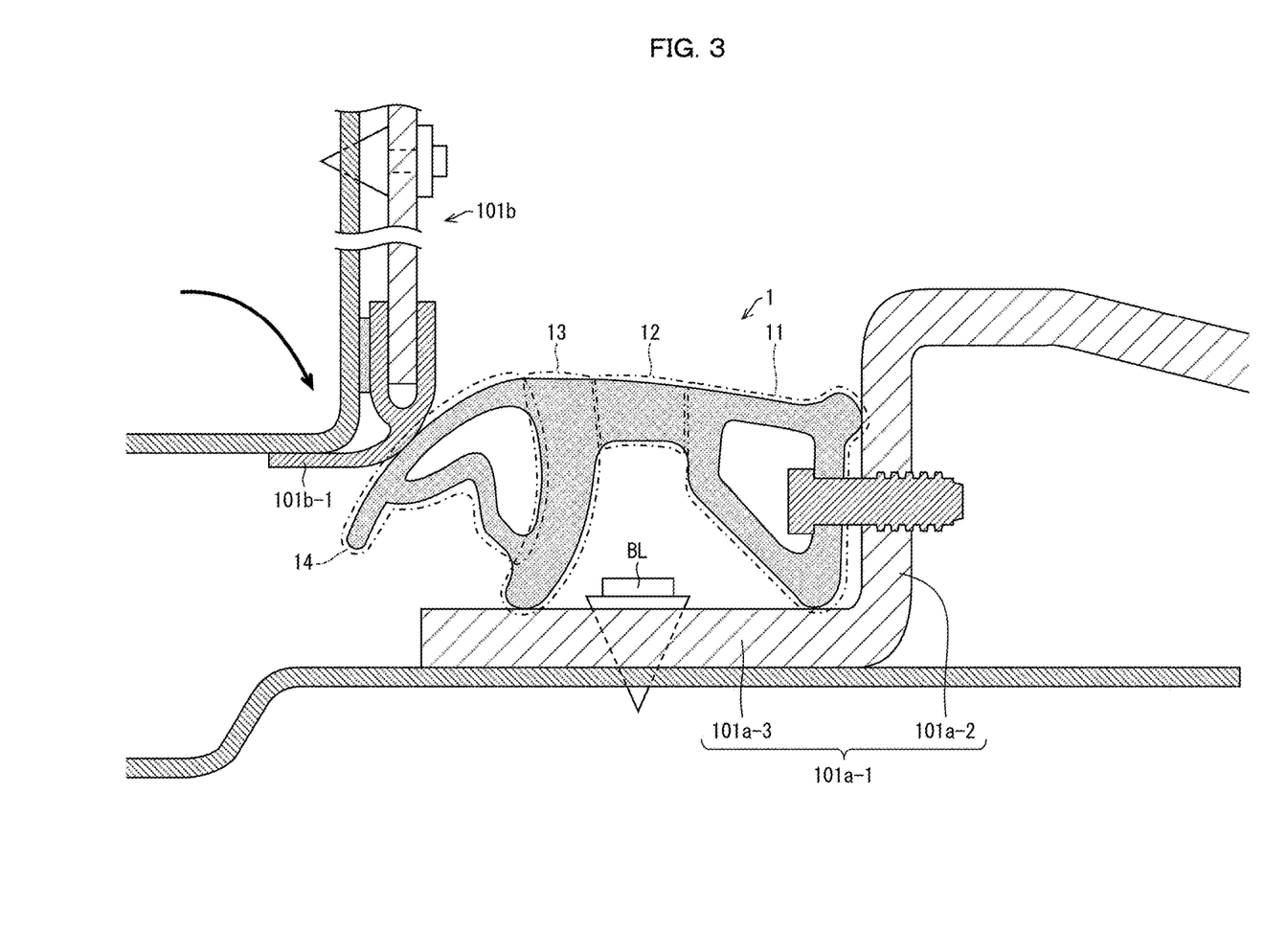
FIG. 3 is a cross-sectional view illustrating a buffer in accordance with an embodiment of the present invention, the buffer being in a bent state while a tailgate is closed.

As illustrated in FIG. 1, the pickup truck 100 (vehicle), to which the buffer 1 is mounted, has at its rear portion the cargo bed 101 (baggage-containing section) for containing baggage 200 (see FIGS. 2 and 3). A baggage gateway 101a is formed by side walls at a rear end of the cargo bed 101. A tailgate 101b (opening and closing member) which can be opened and closed is provided to the rear end of the cargo bed 101. The baggage gateway 101a is closed by the tailgate 101b while the pickup truck 100 is moving or temporarily stopped.

The tailgate 101b is provided to facilitate, for example, loading of the baggage 200 onto the cargo bed 101. The tailgate 101b is fixed to the cargo bed 101 by a hinge (not shown), provided to a lower end of the baggage gateway 101a, in a manner such that the tailgate 101b can be opened and closed. When the tailgate 101b is caused to fall flat, with the hinge serving as a fulcrum, the tailgate 101b becomes substantially horizontal, as illustrated in FIG. 1.

In a case where the baggage 200 is unloaded or loaded onto the cargo bed 101, the baggage 200 passes through the baggage gateway 101a after the tailgate 101b has been opened.

The buffer 1 is a member for preventing the baggage 200 from impacting a lower edge 101a-1 of the baggage gateway 101a when the baggage 200 is loaded and unloaded through the baggage gateway 101a. As illustrated in FIG. 1, the buffer 1 is mounted so as to cover substantially all areas of the lower edge 101a-1. Examples of possible materials for the buffer 1 include elastic materials such as synthetic rubber or thermoplastic elastomers (TPE). Possible examples of the synthetic rubber include EPDM (ethylene-propylene-diene rubber), and possible examples of the thermoplastic elastomers include an olefin-based thermoplastic elastomer (TPO). A foam material and a non-foam material can be used as elastic materials of the buffer 1 in differing parts of the buffer 1 as viewed in a cross section.

Particularly in a case where the baggage 200 loaded or unloaded through the baggage gateway 101a is heavy, once the tailgate 101b has been opened, the baggage 200 will be dragged through the baggage gateway 101a on a surface of the tailgate 101b. The "surface of the tailgate 101b" here refers to a surface of the tailgate 101b which surface faces a vehicle-interior side while the tailgate 101b is closed.

The lower edge 101a-1 has an L-shaped cross section (see FIG. 2). As such, in a case where the buffer 1 is not mounted to the lower edge 101a-1, an edge of the baggage 200 will impact the lower edge 101a-1 when the baggage 200 passes over the lower edge 101a-1 while being dragged. Since the lower edge 101a-1 is made of metal, this impact will damage not only the baggage 200, but also the lower edge 101a-1. The buffer 1 is therefore mounted to the lower edge 101a-1 in order to prevent the edge of the baggage 200 from impacting the lower edge 101a-1.

Note that the above example of mounting the buffer 1 to the lower edge 101a-1 is merely one example. For example, in the case of a truck having a cargo bed whose side walls are all gates which can be opened and closed, the buffer 1 can be mounted to respective lower edges (not shown) of each baggage gateway. In other words, the buffer 1 need only be a member mounted to a lower edge of a baggage gateway through which baggage is loaded onto and unloaded from baggage-containing equipment, a baggage-containing structure, or the like (baggage-containing section).

<Structure of Buffer>

Next, the following description will discuss the structure of the buffer 1 with reference to FIGS. 2 and 3. FIG. 2 is a cross-sectional view schematically illustrating the buffer 1. FIG. 3 is a cross-sectional view illustrating the buffer 1 being in a bent state while the tailgate is closed. As illustrated in FIG. 2, the buffer 1 includes a fixing section 11, a connecting section 12, a contact section 13, and a hollow sealing section 14 (sealing section). Note that, for convenience, vertically upward may be referred to as upward, and vertically downward may be referred to as downward.

The fixing section 11 is a part which is substantially square in shape and has a first hollow section 11a. The fixing section 11 is fixed along a vehicle-exterior-side surface of a vertical portion 101a-2 of the lower edge 101a-1, the vertical portion being a portion which stands up vertically. More specifically, a hole is formed in a first wall 11b of the fixing section 11, the first wall 11b being substantially plate-shaped and facing the vertical portion 101a-2 of the lower edge 101a-1. A hole is also formed in the vertical portion 101a-2 so as to positionally correspond to the hole of the first wall 11b and so as to have a diameter equal to that of the hole of the first wall 11b. A clip 50 made of synthetic resin is inserted into these two holes from a first hollow section 11a side, so as to fix the fixing section 11 to the vertical portion 101a-2.

A second wall 11c of the fixing section 11 is substantially plate-shaped and faces a horizontal portion 101a-3 of the lower edge 101a-1. The second wall 11c is connected to a lower end of the first wall 11b so as to form a connecting part 11g and extends diagonally upward toward a connecting section 12 (described later). As such, of the fixing section 11, only the connecting part 11g is in contact with the horizontal portion 101a-3. Note that the horizontal portion 101a-3 is a portion, of the lower edge 101a-1, which is fixed to a surface of the cargo bed 101 at a rear end of the cargo bed 101.

The first hollow section 11a is a region surrounded by (i) the first wall 11b, (ii) the second wall 11c, (iii) a first connecting wall 11d which connects to the connecting section 12, and (iv) a first upper wall 11e which is substantially plate-shaped and which comes into direct contact with the baggage 200.

A protruding section 11f which protrudes toward the vertical portion 101a-2 of the lower edge 101a-1 is formed at a position where the first wall 11b and the first upper wall 11e are connected. A tip of the protruding section 11f comes into contact with the vertical portion 101a-2 such that a gap is formed between the first wall 11b and the vertical portion 101a-2.

Because the first hollow section 11a is formed in the fixing section 11, the fixing section 11 can, in its entirety, bend more easily than in a configuration in which the first hollow section 11a is not formed. Furthermore, only the connecting part 11g is in contact with the horizontal portion 101a-3, and a gap is formed between the second wall 11c and the vertical portion 101a-2. As such, in a case where the baggage 200 is on top of the buffer 1, the second wall 11c is displaced toward a vertical portion 101a-2 side due to bending of the fixing section 11 (see the dashed lines in FIG. 2). This displacement makes it possible for the buffer 1 to effectively buffer the load of the baggage 200 (that is, act as a cushion) and makes it possible to better reduce damage to and wearing down of the buffer 1. This makes both the buffer 1 and the baggage 200 less likely to be worn down or damaged in a case where the baggage 200 is moved by being dragged over the buffer 1.

Note that it is not necessary for the fixing section 11 to include the protruding section 11*f*. The second wall 11*c* may be formed in a manner so as to be entirely in contact with the horizontal portion 101*a*-3. Furthermore, the fixing section 11 may be fixed to the horizontal portion 101*a*-3. In other words, the fixing section 11 need only be fixed along the lower edge 101*a*-1.

The connecting section 12 is a substantially plate-shaped part which connects the fixing section 11 and the contact section 13 (described later). The connecting section 12 extends from a position on the fixing section 11 at which the first connecting wall 11*d* and the first upper wall 11*e* are connected. Providing the connecting section 12 between the fixing section 11 and the contact section 13 in this manner allows the buffer 1 to bend more easily than in a configuration where the fixing section 11 and the contact section 13 are directly connected to each other.

More specifically, a top portion A (first top portion) of a vehicle-exterior-side face of the fixing section 11 is smoothly connected to a top portion of a vehicle-interior-side face of the connecting section 12, without an abrupt difference in level therebetween. A top portion B (second top portion) of a vehicle-interior-side face of the contact section 13 (described later) is smoothly connected to a top portion of a vehicle-exterior-side face of the connecting section 12, without an abrupt difference in level therebetween and without a depression formed therebetween.

This manner of connection makes it possible for the baggage 200 to pass more smoothly over the buffer 1 than in a configuration where, for example, a depression is formed in a region where the top portion B of the vehicle-interior-side face of the contact section 13 is connected to the top portion of the vehicle-exterior-side face of the connecting section 12. This makes both the buffer 1 and the baggage 200 less likely to be worn down or damaged in a case where the baggage 200 is moved by being dragged over the buffer 1.

At a vehicle-interior-side end of the connecting section 12, the connecting section 12 is provided such that a lower surface thereof is vertically upward of the surface of the horizontal portion 101*a*-3 of the lower edge 101*a*-1 at a height H3 obtained by subtracting (a) a thickness T1, in a vertical direction, of the vehicle-interior-side end of the connecting section 12 from (b) a height H1, in the vertical direction, measured from the surface of the horizontal portion 101*a*-3 to the top portion A of the vehicle-exterior-side face of the fixing section 11. At a vehicle-exterior-side end of the connecting section 12, the connecting section 12 is provided such that the lower surface thereof is vertically upward of the surface of the horizontal portion 101*a*-3 at a height H4 obtained by subtracting (a) a thickness T2, in the vertical direction, of the vehicle-exterior-side end of the connecting section 12 from (b) a height H2, in the vertical direction, measured from the surface of the horizontal portion 101*a*-3 to the top portion B of the vehicle-interior-side face of the contact section 13.

If the connecting section 12 were, for example, provided such that the lower surface thereof is in contact with the horizontal portion 101*a*-3 of the lower edge 101*a*-1, the entirety of the contact section 13 would not be displaced at all when the baggage 200 is on top of the buffer 1. The buffer 1 would therefore not be able to effectively buffer the load of the baggage 200 (that is, act as a cushion), and damage to and wearing down of the buffer 1 would occur due to the baggage 200 being dragged.

However, with the above-described structure of the connecting section 12, because the lower surface of the connecting section 12 is provided vertically upward of the horizontal portion 101*a*-3 of the lower edge 101*a*-1, the entirety of the contact section 13 is easily displaced when the baggage 200 is on top of the buffer 1. This makes it possible for the buffer 1 to effectively buffer the load of the baggage 200 (that is, act as a cushion) while also better reducing damage to and wearing down of the buffer 1 caused by the baggage 200 being dragged.

Furthermore, an upper surface of the connecting section 12 is somewhat curved so as to protrude vertically upward. This makes it possible for the baggage 200 to pass over the buffer 1 even more smoothly than in a configuration where, for example, the upper surface of the connecting section 12 is curved so as to be depressed vertically downward. This as well makes both the buffer 1 and the baggage 200 less likely to be worn down or damaged in a case where the baggage 200 is moved by being dragged over the buffer 1.

The contact section 13 is a plate-like part which extends from an end of the connecting section 12 on a side away from the fixing section 11 in a manner so as to curve toward the horizontal portion 101*a*-3 of the lower edge 101*a*-1. A tip 13*a* of the contact section 13 comes into contact with the surface of the horizontal portion 101*a*-3 (lower edge).

Specifically, the contact section 13 is formed such that, in a state where the buffer 1 has been mounted to the lower edge 101*a*-1, the contact section 13 extends toward a vehicle-exterior side from the vehicle-exterior-side end of the connecting section 12 (that is, from a position where the contact section 13 is connected to the connecting section 12). The contact section 13 somewhat curved so as to protrude toward a fixing section 11 side. The tip 13*a* of the contact section 13 is not connected to the connecting part 11*g* of the fixing section 11. This allows the tip 13*a* and the connecting part 11*g* to be easily displaced in a horizontal direction.

Because the contact section 13 is formed in the above manner, when the baggage 200 is placed on the buffer 1, the contact section 13 is easily displaced toward the vehicle-exterior side in a manner such that the tip 13*a* and nearby portions of the contact section 13 rotate around an attached portion of the contact section 13 (see the dashed line in FIG. 2). This makes it possible for the buffer 1 to effectively buffer the load of the baggage 200 (that is, act as a cushion) and makes it possible to better reduce damage to and wearing down of the buffer 1.

If the contact section 13 were, for example, formed so as to extend, from a position where it connects to the lower surface of the connecting section 12, in a curved manner toward a vehicle-interior side, the contact section 13 would easily flatten down toward a vehicle-interior side of the horizontal portion 101*a*-3 when the baggage 200 is on the buffer 1. If the contact section 13 were to flatten down in this way, the contact section 13 would impact a head of a bolt BL for mounting the lower edge, and the connecting section 12 could then potentially sustain damage depending on the load of the baggage 200.

Furthermore, bending of the contact section 13 would expose a portion of the lower edge 101*a*-1 which is more toward a vehicle-exterior side than is the position of contact with the contact section 13, and as such there would be a risk that such a portion would damage the baggage 200 by an impact. Still further, there would be the need to increase space for mounting the buffer 1 in order to prevent the contact section 13 from impacting the head of the bolt BL. Such a configuration would not, therefore, be practical.

If the contact section 13 were, for example, formed so as to extend straight downward vertically in a substantially linear manner from the position where it connects to lower surface of the connecting section 12, it would become difficult for the contact section 13 to flatten down when the baggage 200 is on the buffer 1. The buffer 1 would therefore not be able to effectively buffer the load of the baggage 200, and, as a result, there would be an increased risk that the connecting section 12 would be worn down and/or damaged.

However, with the above-described structure of the contact section 13, the entirety of the contact section 13 (and in particular, the tip 13a and nearby portions) can easily be displaced toward a vehicle-exterior side when the baggage 200 is on the buffer 1. This makes it possible for the buffer 1 to more effectively buffer the load of the baggage 200 (that is, act as a cushion) while also better reducing damage to and wearing down of the buffer 1 caused by the baggage 200 being dragged.

Furthermore, if the vehicle-interior-side end or the vehicle-exterior-side end of the lower surface of the connecting section 12 were, for example, provided so as to come in contact with an upper surface of the head of the bolt BL, the vehicle-interior-side end or the vehicle-exterior-side end would forcefully come into contact with the upper surface of head of the bolt BL when the baggage 200 is placed on the buffer 1. The contact section 13 would therefore not easily flatten down and the buffer 1 would not be able to effectively buffer the load of the baggage 200. As a result, there would be an increased risk that the lower surface of the connecting section 12 would be worn down and/or damaged.

However, with the above-described structure of the contact section 13, neither the vehicle-interior-side end nor the vehicle-exterior-side end of the lower surface of the connecting section 12 comes into contact with the upper surface of the head of the bolt BL when the baggage 200 is placed on the buffer 1. The contact section 13 can therefore flatten down easily. This makes it possible for the buffer 1 to effectively buffer the load of the baggage 200 and makes it possible to reduce wearing down of and damage to the lower surface of the connecting section 12.

The contact section 13 has a thickness B1 which is greater than (i) a thickness of the fixing section 11 and (ii) thicknesses of the hollow sealing section 14 (described later; a thickness B2 of a second upper wall 14b and a thickness B3 of a second connecting wall 14c). The thickness of the contact section 13 is substantially identical to a thickness of the connecting section 12. A reason for setting the thickness of the contact section 13 in the above manner is that if the thickness of the contact section 13 were less than the thicknesses of the hollow sealing section 14, then when the baggage 200 is placed on the hollow sealing section 14, a substantially central portion of the contact section 13 would bend and come into contact with the horizontal portion 101a-3 before the hollow sealing section 14 bends. The buffer 1 would therefore not be able to effectively buffer the load of the baggage 200.

Furthermore, when the tailgate 101b is in closed state, the substantially central portion of the contact section 13 would bend and come into contact with the horizontal portion 101a-3 before the hollow sealing section 14 bends. This would impair the sealing ability of the buffer 1.

However, setting the respective thicknesses of the connecting section 12 and the contact section 13 in the above manner renders the connecting section 12 and the contact section 13 less bendable than the hollow sealing section 14. This allows the buffer 1 to effectively buffer the load of the baggage 200 and improves the sealing ability of the buffer 1.

The hollow sealing section 14 has a second hollow section 14a (hollow section) formed therein and is configured to seal a space between the lower edge 101a-1 of the baggage gateway 101a and the tailgate 101b. As illustrated in FIG. 3, once the tailgate 101b is closed (see the arrow indicating the path of movement in FIG. 3), a cover 101b-1 (described in detail later) of the tailgate 101b comes into contact with the second upper wall 14b of the hollow sealing section 14. Furthermore, a corner of a lower end of the tailgate 101b (this corner described in detail later) depresses the second upper wall 14b, and the entirety of the hollow sealing section 14 bends. This bending causes the hollow sealing section 14 to produce a reactive force against the depression by the corner of the lower end of the tailgate 101b, and as a result the second upper wall 14b is put into close contact with the cover 101b-1.

Note that, in terms of improving the sealing ability of the buffer 1, is it preferable for the hollow sealing section 14 to be structured such that a reactive force produced by the hollow sealing section 14 when the tailgate 101b is closed is not so large that it becomes difficult to close the tailgate 101b. In other words, it is preferable for the second upper wall 14b and the second connecting wall 14c to have respective thicknesses such that the reactive force is not so large that it becomes difficult to close the tailgate 101b, or for the second hollow section 14a to have a size such that the reactive force is not so large that it becomes difficult to close the tailgate 101b.

The second upper wall 14b is a part of the hollow sealing section 14 which comes into direct contact with the baggage 200. The second upper wall 14b is substantially plate-shaped and extends, toward a vehicle-exterior side, from a top portion C (third top portion) of a vehicle-exterior-side face of the contact section 13, in a manner so as to be somewhat inclined vertically downward. The second upper wall 14b is somewhat curved so as to protrude vertically upward.

The second upper wall 14b, the first upper wall 11e of the fixing section 11, and the connecting section 12 form an upper wall of the buffer 1. The upper wall of the buffer 1 is, in its entirety, somewhat curved so as to protrude vertically upward. The upper wall of the buffer 1 has a smooth surface without an abrupt difference in level.

The second connecting wall 14c is substantially plate-shaped and is formed so as to extend diagonally downward toward the contact section 13 from a part of the second upper wall 14b which is somewhat more toward the contact section 13 than is the tip of the second upper wall 14b. The second connecting wall 14c is connected to a part of the contact section 13 which is somewhat more vertically upward than is the tip 13a of the contact section 13. A substantially central portion of the second connecting wall 14c is somewhat curved so as to protrude toward the second hollow section 14a.

The second hollow section 14a is a region surrounded by (i) the second upper wall 14b, (ii) the second connecting wall 14c, and (iii) a region of the contact section 13 extending from (a) a position where the contact section 13 is connected to the second upper wall 14b to (b) a position where the contact section 13 is connected to the second connecting wall 14c.

In a state where the buffer 1 has been mounted to the lower edge 101a-1 of the baggage gateway 101a, an end of the second upper wall 14b and a vertically upward part of the second connecting wall 14c both project more toward a vehicle-exterior side than does the end of the horizontal portion 101a-3. Providing the hollow sealing section 14 so as to have such a shape and size makes it possible for the projecting part of the hollow sealing section 14 to cover and protect the end of the horizontal portion 101a-3 and nearby portions in a case where, for example, the hollow sealing section 14 has bent significantly due to the baggage 200 being on the second upper wall 14b.

The second connecting wall 14c being connected to the contact section 13 in the above manner allows the tip 13a to be more easily displaced toward a vehicle-exterior side than in a configuration where the second connecting wall 14c is connected to the tip 13a of the contact section 13. This makes it possible for the buffer 1 to effectively buffer the load of the baggage 200 and makes it possible to better reduce damage to and wearing down of the buffer 1.

In comparison to a configuration where the second connecting wall 14c extends linearly, the second connecting wall 14c being curved in the above manner allows the second connecting wall 14c to more easily bend in a manner so as to protrude toward the second hollow section 14a in a case where the baggage 200 is on the second upper wall 14b or when the tailgate 101b is closed. Furthermore, the second upper wall 14b easily bends so as to become substantially parallel to the horizontal portion 101a-3 of the lower edge 101a-1. This makes it possible for the buffer 1 to effectively buffer the load of the baggage 200. This also reduces a compressive load (and a reactive force) occurring in the buffer 1 while the tailgate 101b is closed.

By having the hollow sealing section 14, the buffer 1 has not only a main function of preventing an impact between the baggage 200 and the lower edge 101a-1 of the baggage gateway 101a, but also a function of sealing a space between the lower edge 101a-1 and the tailgate 101b.

The size of the second hollow section 14a is not particularly limited, but in terms of effectively absorbing the load applied to the buffer 1 by the baggage 200, and in terms of reducing a compressive load occurring in the buffer 1 while the tailgate 101b is closed, the second hollow section 14a is preferably as large as possible. The second connecting wall 14c is therefore preferably connected in the manner describe above.

<Relation Between Movement of Baggage and Bending of Buffer>

Figure 4:
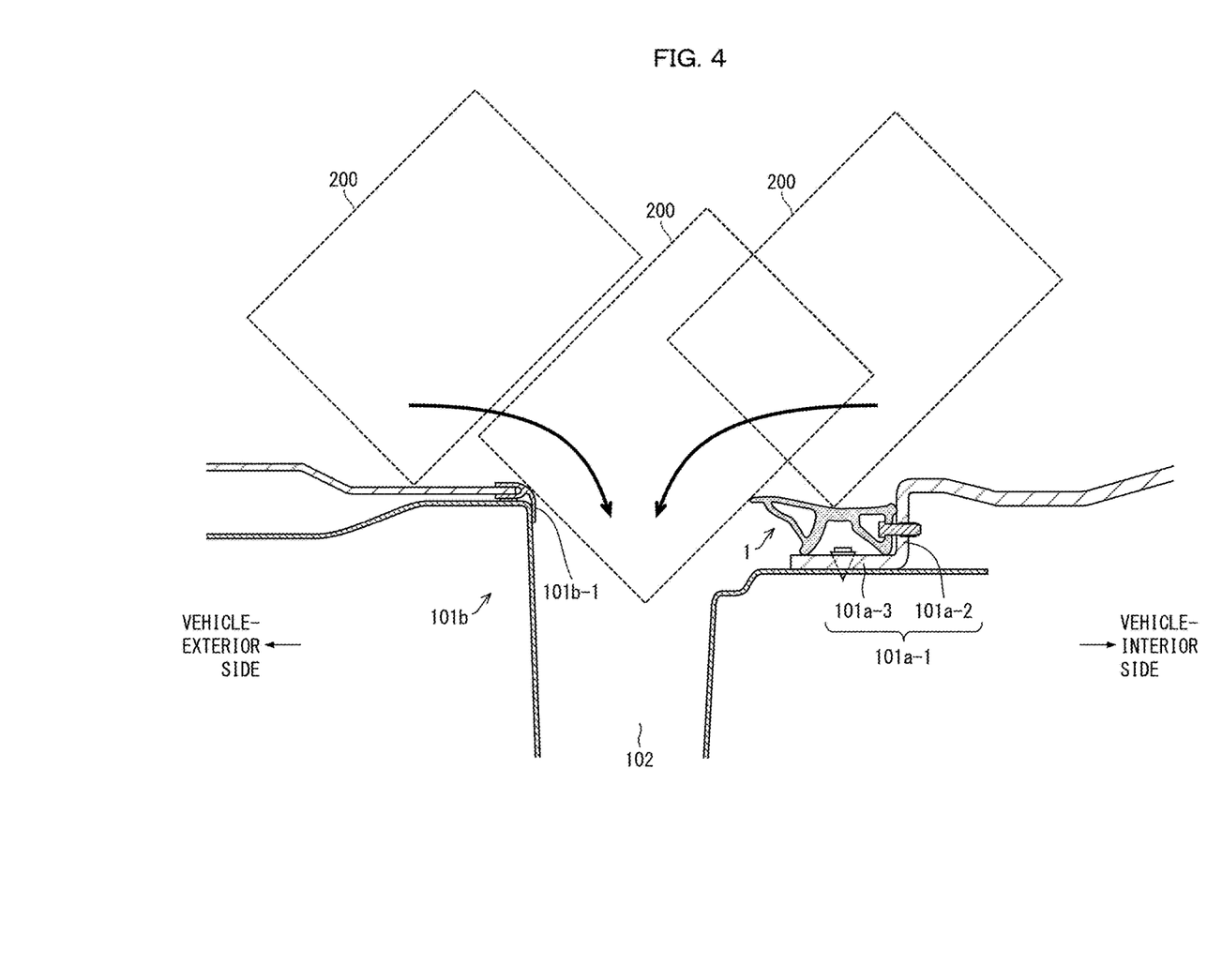
FIG. 4 illustrates a state of the buffer in a case where the tailgate is open and baggage is loaded/unloaded.

Next, the following description will discuss, with reference to FIG. 4, the relation between movement of the baggage 200 and bending of the buffer 1. FIG. 4 illustrates a state of the buffer 1 in a case where the tailgate 101b is open and the baggage 200 is loaded onto/unloaded from the cargo bed 101. FIG. 4 illustrates an example in which the baggage 200 is heavy and is loaded or unloaded, while the tailgate 101b is open, by being dragged over the surface of the tailgate 101b and floor of the cargo bed 101.

As illustrated in FIG. 4, while the tailgate 101b is open, a groove 102 is formed between the tailgate 101b and the rear end of the cargo bed 101. In a case where the baggage 200 is moved by being dragged toward a vehicle-exterior side, a part of the baggage 200 will fall into the groove 102.

However, since the buffer 1 is mounted along the lower edge 101a-1 of the baggage gateway 101a at a rear-end side of the cargo bed 101, the part of the baggage 200 impacts the hollow sealing section 14 of the buffer 1. This impact causes the hollow sealing section 14 and the contact section 13 to bend such that the buffer 1 protects the horizontal portion 101a-3 of the lower edge 101a-1.

A cover 101b-1 is mounted to the corner of the lower end of the tailgate 101b (i.e., to a part of the tailgate 101b which is opposite the lower edge 101a-1 when the tailgate 101b is open). The cover 101b-1 has a shape which corresponds to the shape of the corner. The cover 101b-1 is a member for preventing an impact between the baggage 200 and the corner of the lower end of the tailgate 101b. The cover 101b-1 makes it possible to prevent damage to the lower end of the tailgate 101b even when a part of the baggage 200 falls into the groove 102.

In a case where the baggage 200 is moved by being dragged such that a corner of the baggage 200 is located above the horizontal portion 101a-3 of the lower edge 101a-1, the buffer 1 being present between the corner of the baggage 200 and the horizontal portion 101a-3 prevents an impact therebetween. Specifically, the connecting section 12 and the contact section 13 bend such that the buffer 1 protects the horizontal portion 101a-3 and a vertically upward end of the vertical portion 101a-2.

Regardless of whether the baggage 200 is moved toward a vehicle-exterior side or toward a vehicle-interior side, there is substantially no difference in the protection afforded by the buffer 1 when a part of the baggage 200 falls into the groove 102 and when a corner of the baggage 200 is located above the horizontal portion 101a-3, except that the corner of the baggage 200 comes into contact with the various members in a different order (see the arrows in FIG. 4.). This makes it possible to prevent damage to the lower edge 101a-1 of the baggage gateway 101a and to the lower end of the tailgate 101b regardless of the direction in which the baggage 200 moves.

<Variation of Buffer>

Figure 5:
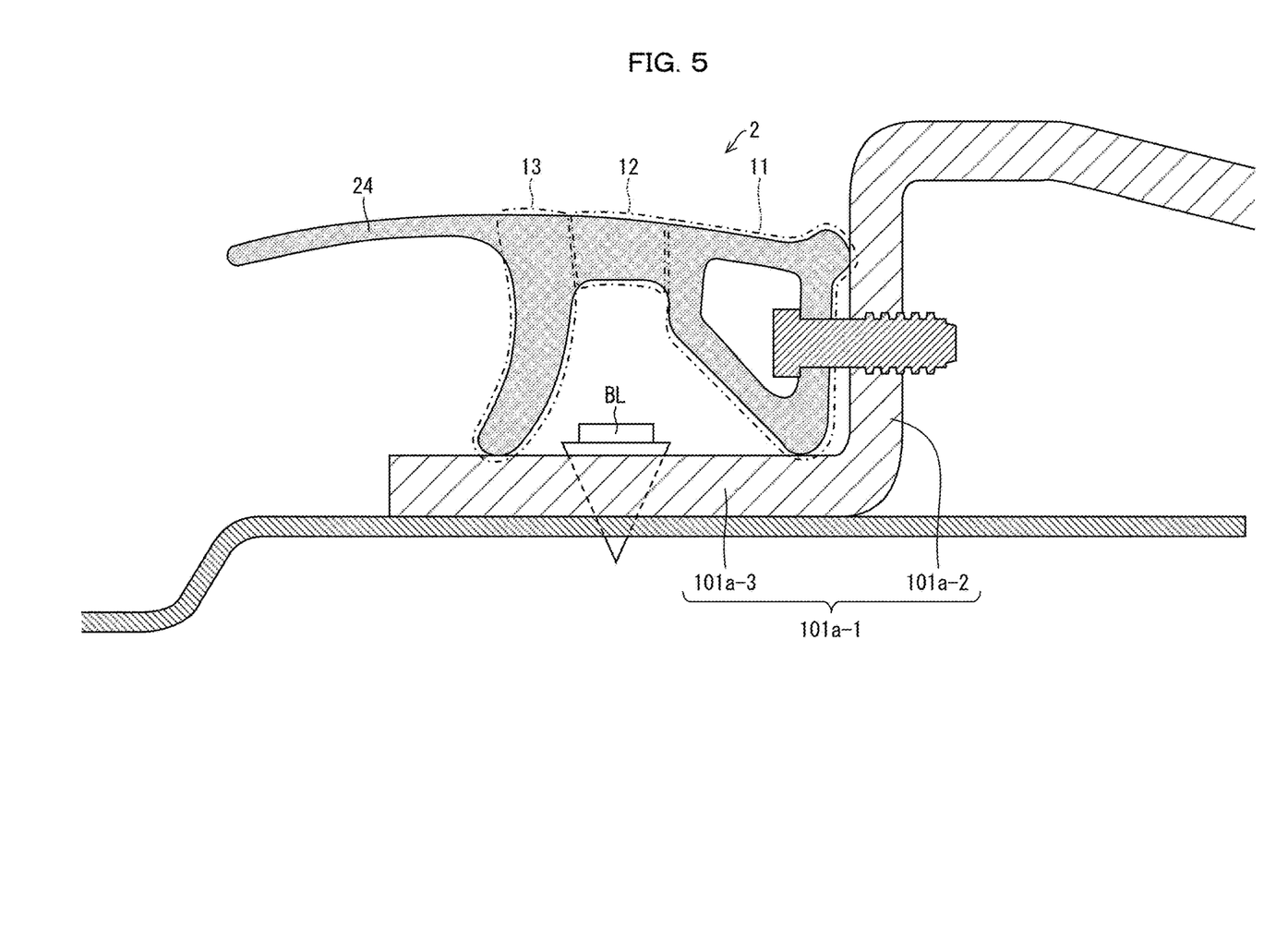
FIG. 5 is a cross-sectional view schematically illustrating a variation of a buffer in accordance with an embodiment of the present invention.

A buffer in accordance with an aspect of the present invention is not limited to the above-described configuration of the buffer 1, but rather a plurality of variations are possible. The following description will discuss this with reference to FIG. 5. FIG. 5 is a cross-sectional view schematically illustrating a variation of the buffer 1.

A main object of mounting a buffer in accordance with an aspect of the present invention to the lower edge 101a-1 of the baggage gateway 101a is to prevent an impact between the baggage 200 and the lower edge 101a-1. A buffer in accordance with an aspect of the present invention is capable of attaining this main object, provided that the buffer has a minimum configuration required to prevent an impact between the baggage 200 and the lower edge 101a-1.

With regards to the minimum configuration required to attain the main object, a buffer in accordance with an aspect of the present invention need only include the fixing section 11, the connecting section 12, and the contact section 13. In other words, the hollow sealing section 14 is not an essential component element of a buffer in accordance with the present invention.

As such, a buffer in accordance with an aspect of the present invention can for example include, instead of the hollow sealing section 14, a sealing section 24 which is substantially identical in shape to the second upper wall 14b of the hollow sealing section 14 and is lip-like, as illustrated in FIG. 5. In other words, a buffer in accordance with an aspect of the present invention may include a sealing section which does not have a hollow section formed therein. In such a case, from the standpoint of, for example, effectively buffering the load of the baggage 200, the sealing section 24 has a thickness which is preferably greater than that of the second upper wall 14b.

In another example (not shown), a buffer in accordance with an aspect of the present invention may be configured so as to include neither the hollow sealing section 14 illustrated in FIG. 2 nor the sealing section 24 illustrated in FIG. 5. In other words, the buffer may be configured so as not to include a sealing section. In such a case, in terms of preventing an impact between the baggage 200 and the lower edge 101*a*-1, it is preferable that the tip 13*a* of the contact section 13 reach the end of the horizontal portion 101*a*-3 of the lower edge 101*a*-1 when the buffer, not having the sealing section, bends due to the baggage 200 being on the buffer. In other words, the contact section 13 preferably has a length in the vertical direction such that, when the buffer not having the sealing section bends, the tip 13*a* of the contact section 13 reaches the end of the horizontal portion 101*a*-3.

<Recap>

In order to solve the above problems, a buffer in accordance with an aspect of the present invention is a buffer which mounts to a lower edge of a baggage gateway through which baggage is loaded onto and unloaded from a baggage-containing section for containing the baggage, the buffer including: a fixing section which is configured to be fixed along the lower edge; a contact section having a tip which tip comes into contact with the lower edge; and a connecting section which connects (i) a first top portion, which is a top portion of a vehicle-exterior-side face of the fixing section, to (ii) a second top portion, which is a top portion of a vehicle-interior-side face of the contact section, the contact section and the connecting section each being made of an elastic material, the connecting section being provided such that, in a state where the buffer has been mounted to the lower edge: at a vehicle-interior-side end of the connecting section, a lower surface of the connecting section is vertically upward of a surface of the lower edge at a height obtained by subtracting (a) a thickness, in a vertical direction, of the vehicle-interior-side end of the connecting section from (b) a height, in the vertical direction, measured from the surface of the lower edge to the first top portion; and at a vehicle-exterior side end of the connecting section, the lower surface of the connecting section is vertically upward of the surface of the lower edge at a height obtained by subtracting (a) a thickness, in the vertical direction, of the vehicle-exterior-side end of the connecting section from (b) a height, in the vertical direction, measured from the surface of the lower edge to the second top portion.

If the connecting section were, for example, connected to the vehicle-exterior-side face of the fixing section and to the vehicle-interior-side face of the contact section at positions which were not the respective top portions thereof, a vertically downward depression would be formed between the position where the connecting section connects to the fixing section and the position where the connecting section connects to the contact section. As such, when baggage is on the connecting section, a corner of the baggage which contacts the upper surface of the connecting section would get caught in the depression, and the connecting section or the fixing section would be worn down and damaged.

However, with the above configuration, such a depression is not formed. As such, even in a case where baggage is loaded or unloaded by being dragged through the baggage gateway of the baggage-containing section, the baggage can move smoothly over the buffer in accordance with an aspect of the present invention without getting caught on the connecting section. This makes it possible to provide a buffer which, when baggage is loaded onto and unloaded from the baggage-containing section through the baggage gateway, prevents damage to the lower edge of the baggage gateway and which is not easily worn down or damaged when rubbed by the baggage.

If the connecting section were, for example, provided such that the lower surface thereof is in contact with the lower edge, the entirety of the contact section will not be displaced at all when the baggage is on top of the buffer. The buffer would therefore not be able to effectively buffer the load of the baggage (that is, act as a cushion), and damage to and wearing down of the buffer would occur due to the baggage being dragged.

However, with the above configuration, because the lower surface of the connecting section is provided vertically upward of the surface of the lower edge, the entirety of the contact section is easily displaced when the baggage is on top of the buffer in accordance with an aspect of the present invention. This makes it possible for the buffer to effectively buffer the load of the baggage (that is, act as a cushion) while also better reducing damage to and wearing down of the buffer caused by the baggage being dragged.

In another aspect of the present invention the buffer can be arranged such that: the contact section is formed such that, in a state where the buffer has been mounted to the lower edge, the contact section extends, in a curved manner, toward a vehicle-exterior side from a position where the contact section is connected to the connecting section; and in the state where the buffer has been mounted to the lower edge, the vehicle-interior-side end of the connecting section and the vehicle-exterior-side end of the connecting section are both vertically upward of an upper surface of a head of a bolt for mounting the lower edge.

If the contact section were, for example, formed so as to extend from the lower surface of the connecting section in a curved manner toward a vehicle-interior side, the contact section would easily flatten down toward a vehicle-interior side of the horizontal portion of the lower edge when the baggage is on the buffer. If the contact section were to flatten down in this way, the contact section would impact a head of a bolt for mounting the lower edge, and the connecting section could then potentially sustain damage depending on the load of the baggage. Furthermore, bending of the contact section would expose a portion of the lower edge which is more toward a vehicle-exterior side than is the position of contact with the contact section, and as such there would be a risk that such a portion would damage the baggage by an impact. Still further, there would be the need to increase space for mounting the buffer in order to prevent the contact section from impacting the head of the bolt for mounting the lower edge. Such a configuration would not, therefore, be practical.

If the contact section were, for example, formed so as to extend straight downward vertically in a substantially linear manner from the position where it connects to lower surface of the connecting section, it would become difficult for the contact section to flatten down when the baggage is on the buffer. The buffer would therefore not be able to effectively buffer the load of the baggage, and, as a result, there would be an increased risk that the connecting section would be worn down and/or damaged.

However, with the above configuration, the entirety of the contact section (and in particular, the tip and nearby portions) can easily be displaced toward a vehicle-exterior side when the baggage is on the buffer in accordance with an aspect of the present invention. This makes it possible for the buffer to more effectively buffer the load of the baggage (that is, act as a cushion) while also better reducing damage to and wearing down of the buffer caused by the baggage being dragged.

Furthermore, if the vehicle-interior-side end or the vehicle-exterior-side end of the lower surface of the connecting section were, for example, provided so as to come in contact with an upper surface of the head of the bolt for mounting the lower edge, the vehicle-interior-side end or the vehicle-exterior-side end would forcefully come into contact with the upper surface of head of the bolt when the baggage is placed on the buffer. The contact section would therefore not easily flatten down and the buffer would not be able to effectively buffer the load of the baggage. As a result, there would be an increased risk that the lower surface of the connecting section would be worn down and/or damaged.

However, with the above configuration, neither the vehicle-interior-side end nor the vehicle-exterior-side end of the lower surface of the connecting section comes into contact with the upper surface of the head of the bolt for mounting the lower edge when the baggage is placed on the buffer in accordance with an aspect of the present invention. The contact section can therefore flatten down easily. This makes it possible for the buffer to effectively buffer the load of the baggage and makes it possible to reduce wearing down of and damage to the lower surface of the connecting section.

With the buffer of another aspect of the present invention, an opening and closing member for closing the baggage gateway may be provided to the baggage-containing section in a manner so as to be openable and closable; and the buffer may be arranged such that a sealing section configured to seal a space between the lower edge and the opening and closing member is formed at a third top portion, which is a top portion of a vehicle-exterior-side face of the contact section.

With the above configuration, the buffer in accordance with an aspect of the present invention is capable of not only preventing damage to the lower edge of the baggage gateway by preventing an impact between the baggage and the lower edge, but also sealing a space between the lower edge and the opening and closing member when the baggage gateway is closed by the opening and closing member.

In another aspect of the present invention the buffer can be arranged such that the contact section has a thickness which is greater than a thickness of the sealing section. With the above configuration, the sealing section bends more easily than does the contact section. This makes it possible for the buffer in accordance with an aspect of the present invention to more effectively buffer the load of the baggage and makes it possible to better reduce damage to and wearing down of the buffer. The above configuration also improves the sealing ability of the buffer in accordance with an aspect of the present invention.

With the buffer of another aspect of the present invention, the baggage-containing section may be a cargo bed of a vehicle. The above configuration makes it possible to provide a buffer which, when baggage is loaded onto and unloaded from a through a baggage gateway of a cargo bed, prevents damage to a lower edge of the baggage gateway and which is not easily worn down or damaged when rubbed by the baggage.

<Additional Remarks>

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 2: Buffer
11: Fixing section
12: Connecting section
13: Contact section
13a: Tip
14: Hollow sealing section (sealing section)
14a: Second hollow section (hollow section)
24: Sealing section
100: Pickup truck (vehicle)
101: Cargo bed (baggage-containing section)
101a: Baggage gateway
101a-1: Lower edge
101b: Tailgate (opening and closing member)
200: Baggage
A: Top portion (first top portion)
B: Top portion (second top portion)
C: Top portion (third top portion)
B1: Thickness (thickness of contact section)
B2, B3: Thickness (thickness of sealing section)
BL: Bolt (bolt for mounting lower edge)
H1: Height (height, in vertical direction, measured from surface of lower edge to first top portion)
H2: Height (height, in vertical direction, measured from surface of lower edge to second top portion)
H3: Height (height obtained by subtracting (a) a thickness, in vertical direction, of vehicle-interior-side end of connecting section from (b) a height, in vertical direction, measured from surface of lower edge to first top portion)
H4: Height (height obtained by subtracting (a) a thickness, in vertical direction, of vehicle-exterior-side end of connecting section from (b) a height, in vertical direction, measured from surface of lower edge to second top portion)
T1: Thickness (thickness, in vertical direction, of vehicle-interior-side end of connecting section)
T2: Thickness (thickness, in vertical direction, of vehicle-exterior-side end of connecting section)

The invention claimed is:

1. A buffer which mounts to a lower edge of a baggage gateway through which baggage is loaded onto and unloaded from a baggage-containing section for containing the baggage, the buffer comprising:
   a fixing section which is configured to be fixed along the lower edge;
   a contact section having a tip which tip comes into contact with the lower edge; and
   a connecting section which connects (i) a first top portion, which is a top portion of a vehicle-exterior-side face of the fixing section, to (ii) a second top portion, which is a top portion of a vehicle-interior-side face of the contact section,
   the contact section and the connecting section each being made of an elastic material,
   the connecting section being provided such that, in a state where the buffer has been mounted to the lower edge;
   at a vehicle-interior-side end of the connecting section, a lower surface of the connecting section is vertically upward of a surface of the lower edge at a height obtained by subtracting (a) a thickness, in a vertical direction, of the vehicle-interior-side end of the connecting section from (b) a height, in the vertical direction, measured from the surface of the lower edge to the first top portion; and
   at a vehicle-exterior side end of the connecting section, the lower surface of the connecting section is vertically upward of the surface of the lower edge at a height obtained by subtracting (a) a thickness, in the vertical direction, of the vehicle-exterior-side end of the connecting section from (b) a height, in the vertical direction, measured from the surface of the lower edge to the second top portion, wherein:

the contact section is formed such that, in a state where the buffer has been mounted to the lower edge, the contact section extends, in a curved manner, toward a vehicle-exterior side from a position where the contact section is connected to the connecting section; and in the state where the buffer has been mounted to the lower edge, the vehicle-interior-side end of the connecting section and the vehicle-exterior-side end of the connecting section are both vertically upward of an upper surface of a head of a bolt for mounting the lower edge.

2. The buffer according to claim 1, wherein:

an opening and closing member for closing the baggage gateway is provided to the baggage-containing section in a manner so as to be openable and closable; and a sealing section configured to seal a space between the lower edge and the opening and closing member is formed at a third top portion, which is a top portion of a vehicle-exterior-side face of the contact section.

3. A buffer which mounts to a lower edge of a baggage gateway through which baggage is loaded onto and unloaded from a baggage-containing section for containing the baggage, the buffer comprising:

a fixing section which is configured to be fixed along the lower edge;

a contact section having a tip which tip comes into contact with the lower edge; and a connecting section which connects (i) a first top portion, which is a top portion of a vehicle-exterior-side face of the fixing section, to (ii) a second top portion, which is a top portion of a vehicle-interior-side face of the contact section, the contact section and the connecting section each being made of an elastic material, the connecting section being provided such that, in a state where the buffer has been mounted to the lower edge:

at a vehicle-interior-side end of the connecting section, a lower surface of the connecting section is vertically upward of a surface of the lower edge at a height obtained by subtracting (a) a thickness, in a vertical direction, of the vehicle-interior-side end of the connecting section from (b) a height, in the vertical direction, measured from the surface of the lower edge to the first top portion; and at a vehicle-exterior side end of the connecting section, the lower surface of the connecting section is vertically upward of the surface of the lower edge at a height obtained by subtracting (a) a thickness, in the vertical direction, of the vehicle-exterior-side end of the connecting section from (b) a height, in the vertical direction, measured from the surface of the lower edge to the second top portion, and wherein an opening and closing member for closing the baggage gateway is provided to the baggage-containing section in a manner so as to be openable and closable; and a sealing section configured to seal a space between the lower edge and the opening and closing member is formed at a third top portion, which is a top portion of a vehicle-exterior-side face of the contact section, wherein the contact section has a thickness which is greater than a thickness of the sealing section.

4. A buffer which mounts to a lower edge of a baggage gateway through which baggage is loaded onto and unloaded from a baggage-containing section for containing the baggage, the buffer comprising:

a fixing section which is configured to be fixed along the lower edge;

a contact section having a tip which tip comes into contact with the lower edge; and a connecting section which connects (i) a first top portion, which is a top portion of a vehicle-exterior-side face of the fixing section, to (ii) a second top portion, which is a top portion of a vehicle-interior-side face of the contact section, the contact section and the connecting section each being made of an elastic material, the connecting section being provided such that, in a state where the buffer has been mounted to the lower edge:

at a vehicle-interior-side end of the connecting section, a lower surface of the connecting section is vertically upward of a surface of the lower edge at a height obtained by subtracting (a) a thickness, in a vertical direction, of the vehicle-interior-side end of the connecting section from (b) a height, in the vertical direction, measured from the surface of the lower edge to the first top portion; and at a vehicle-exterior side end of the connecting section, the lower surface of the connecting section is vertically upward of the surface of the lower edge at a height obtained by subtracting (a) a thickness, in the vertical direction, of the vehicle-exterior-side end of the connecting section from (b) a height, in the vertical direction, measured from the surface of the lower edge to the second top portion, wherein the baggage-containing section is a cargo bed of a vehicle.

* * * * *